US008233621B2

(12) United States Patent
Li

(10) Patent No.: US 8,233,621 B2
(45) Date of Patent: Jul. 31, 2012

(54) SLICE-BASED PRIORITIZED SECURE VIDEO STREAMING

(75) Inventor: Qing Li, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 1080 days.

(21) Appl. No.: 12/140,085

(22) Filed: Jun. 16, 2008

(65) Prior Publication Data

US 2010/0002875 A1 Jan. 7, 2010

(51) Int. Cl.
*H04L 9/00* (2006.01)

(52) U.S. Cl. ............... 380/42; 725/25; 725/81; 380/44; 380/210; 375/240.16; 375/240.27; 726/4; 713/189

(58) Field of Classification Search .................. 725/25, 725/81; 380/42, 44, 210; 375/240.16, 240.27; 726/4; 713/189
See application file for complete search history.

(56) References Cited

U.S. PATENT DOCUMENTS

| | | | |
|---|---|---|---|
| 5,796,839 A * | 8/1998 | Ishiguro ......................... 380/44 |
| 7,639,804 B2 * | 12/2009 | Candelore et al. .............. 380/200 |
| 7,958,369 B2 * | 6/2011 | Apostolopoulos ............ 713/189 |
| 2003/0133570 A1 * | 7/2003 | Candelore et al. ............. 380/210 |
| 2003/0152224 A1 * | 8/2003 | Candelore et al. ............. 380/210 |
| 2003/0159139 A1 * | 8/2003 | Candelore et al. .............. 725/25 |
| 2003/0233464 A1 * | 12/2003 | Walpole et al. ................ 709/231 |
| 2005/0286634 A1 * | 12/2005 | Duvivier ................... 375/240.16 |
| 2006/0048193 A1 * | 3/2006 | Jacobs et al. ..................... 725/81 |
| 2006/0090082 A1 * | 4/2006 | Apostolopoulos ............ 713/189 |
| 2007/0130615 A1 * | 6/2007 | Brace et al. ......................... 726/4 |
| 2008/0033881 A1 * | 2/2008 | Ficco ............................... 705/51 |
| 2008/0034276 A1 * | 2/2008 | Ficco ............................ 715/201 |
| 2009/0103635 A1 * | 4/2009 | Pahalawatta ............. 375/240.27 |

* cited by examiner

*Primary Examiner* — April Shan
(74) *Attorney, Agent, or Firm* — Mattingly & Malur, PC

(57) ABSTRACT

Slice-based prioritized secure video streaming comprises a transmitter receiving a slice comprising a plurality of macroblocks and selecting an encryption key based at least in part on a relative importance of secure transmission of the macroblocks. If the importance is high, a master key is selected. If the importance is medium, a first key derivable by applying a one-way function to the master key is selected. If the importance is low, a second key derivable by applying the one-way function to the first key is selected. The slice is encrypted using the encryption key. A receiver receives the encrypted slice, decrypts a header of the slice using the master key, to obtain an indication of a relative importance of secure transmission of the macroblocks. The receiver selects a decryption key based at least in part on the indication, and decrypts the slice using the decryption key.

19 Claims, 13 Drawing Sheets

Encoding Order: 1 4 2 3 7 5 6 10 8 9
Typical GOP Structure Of Compressed Video Sequence Key Structure In Single Layer Prioritized Secure Video Algorithm Key Seeds Generation And Usage Key Structure In Dual Layers Prioritized Secure Video Algorithm

SLICE-BASED PRIORITIZED SECURE VIDEO STREAMING

FIELD OF THE INVENTION

The present invention relates to the field of computer science. More particularly, the present invention relates to slice-based prioritized secure video streaming.

BACKGROUND OF THE INVENTION

Video streaming has attracted significant amount of attention in recent years and has become one of the major types of traffic transmitted over the Internet. Providing secure video streaming is essential for the operation of video streaming applications, such as video on demand and video teleconferencing. Many algorithms have been proposed to secure the transmission of data and voice in environments which do not have Quality of Service (QoS) requirements, or which have low data rates. In contrast, video streaming has relatively high bandwidth and QoS requirements to ensure reliable and high quality delivery. Consequently, simply extending the security algorithms for data and audio to video applications does not provide adequate security and QoS for the streaming applications.

Broadcast-quality TV typically requires up to a 150 Mbps bandwidth channel for transmission, while high definition video can require more than 1 Gbps bandwidth. Therefore, in practice, video streaming is usually transmitted after compression. The MPEG (Moving Picture Experts Group) standards are widely used for video compression algorithms.

In one solution, video is secured by encrypting an entire MPEG video stream, and then decrypting and decoding the stream at the receiver side. However, this solution requires intensive processing at both the transmitter and receiver sides and thus may not be suitable for many video streaming applications. More advanced encryption and decryption algorithms exploit the structure of the MPEG and encrypt only selective frames to save computational overhead. Another solution encrypts only headers and I-frames (intraframes) in the MPEG stream using the DES-CBC mode. This method can significantly reduce the computation overhead required for encryption and decryption. The security rational behind this scheme is that P-frames (predictive frames) and B-frames (bi-directional frames) will be useless if I-frames are encrypted. A security weakness of this selective encryption is that a single P frame or B-frame may reveal little information, but a series of unencrypted P-frames and B-frames can carry much information if the base frames are correlated to each other. Further, there are I-macroblocks contained even in P-frames and B-frames, and these unencrypted I-macroblocks may reveal useful information.

In another solution, Secure MPEG (SECMPEG) employs four levels of security. At the first layer, it encrypts all headers. At the second layer, SECMPEG encrypts DC co-efficients of I-macroblocks in addition to the first layer encryption. At the third layer, SECMPEG encrypts all I-frames and all I-macroblocks in P frames and B-frames. At the fourth layer, SECMPEG encrypts the entire stream. The encryption can be done either with Data Encryption Standard (DES) or RSA. However, SECMPEG requires major changes to the MPEG headers, thus SECMPEG stream is not compatible with the standard MPEG stream and requires special encoder and decoder at both the transmitters and receivers.

Accordingly, a need exists in the art for an improved solution for secure video streaming.

SUMMARY OF THE INVENTION

Slice-based prioritized secure video streaming comprises a transmitter receiving a slice comprising a plurality of macroblocks and selecting an encryption key based at least in part on a relative importance of secure transmission of the macroblocks. If the importance is high, a master key is selected. If the importance is medium, a first key derivable by applying a first one-way function to the master key is selected. If the importance is low, a second key derivable by applying the first one-way function to the first key is selected. The slice is encrypted using the encryption key. A receiver receives the encrypted slice, decrypts a header of the slice using the master key, to obtain an indication of a relative importance of secure transmission of the macroblocks. The receiver selects a decryption key based at least in part on the indication, and decrypts the slice using the decryption key.

According to another aspect, the transmitter additionally determines a plurality of key seeds, each of the key seeds corresponding to a particular one of a plurality of intervals over which a plurality of slices are streamed. The determining comprises applying a second one-way function to a last key seed corresponding to a last interval to obtain a previous key seed corresponding to a previous interval, and continuing to apply the second one-way function to each determined key seed until all key seeds corresponding to all of the plurality of intervals are obtained. If the slice comprises the first slice of a current interval, the transmitter securely transmits a current key seed corresponding to the current interval to one or more receivers. The one or more receivers receive the current key seed and obtain the master key for the current interval by applying the first one-way function to the key seed.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
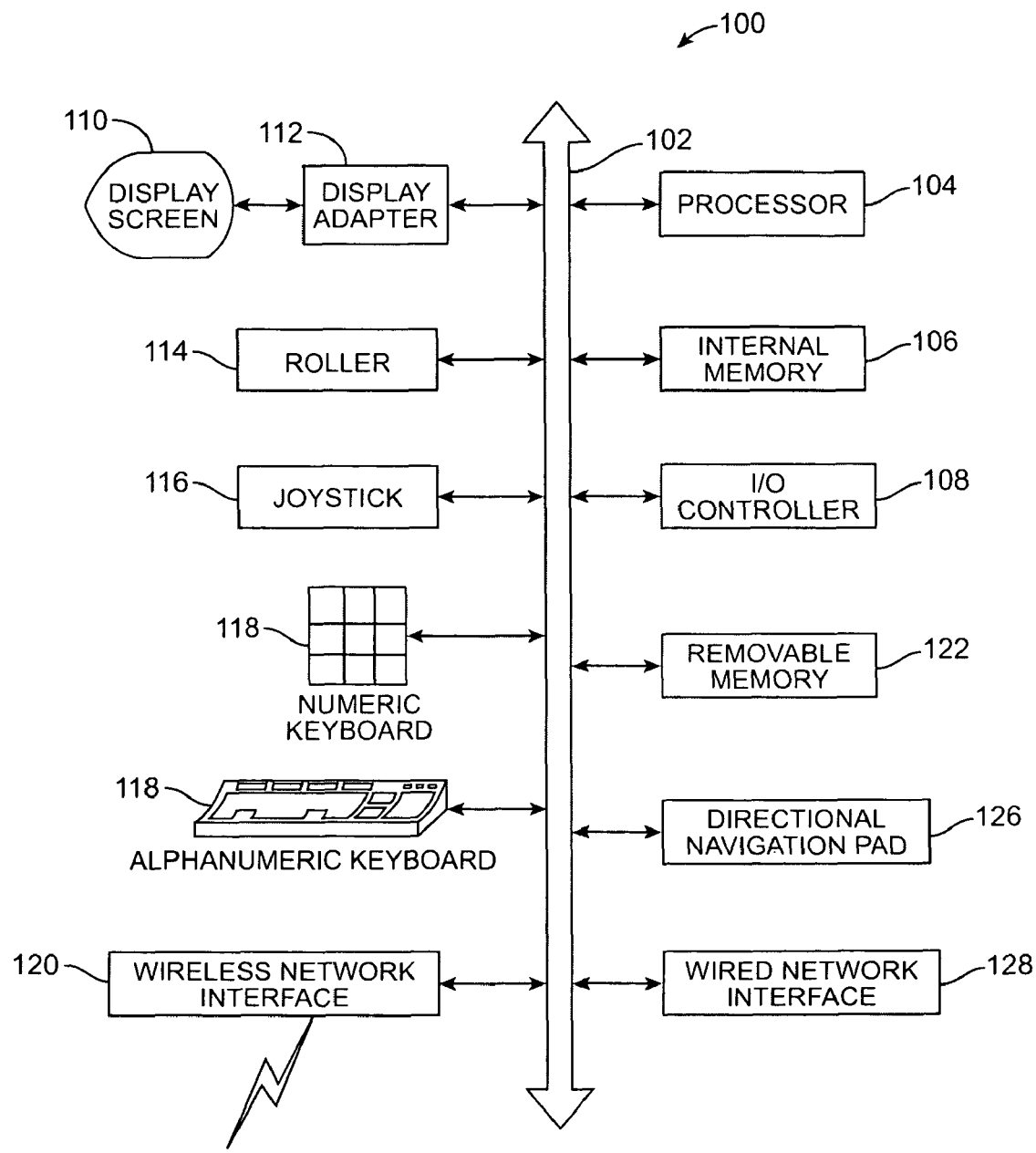
FIG. 1 is a block diagram of a computer system suitable for implementing aspects of the present invention.

Embodiments of the present invention are described herein in the context of slice-based prioritized secure video streaming. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

Example embodiments of the present invention classify video slices based on the importance of secure transmission of the slices, and encrypt the video slices based on the classification. Three keys are used to encrypt the slices: a master key, a first key derived by applying a one-way function to the master key, and a second key derived by applying the one-way function to the first key. The master key is used to encrypt slices for which secure transmission is of relatively high importance. The first key is used to encrypt slices for which secure transmission is of medium importance. The second key is used to encrypt slices for which secure transmission is of relatively low importance. Slices for which secure transmission is of a relatively lowest importance are not encrypted. The encryption enables using keys of higher importance slices to derive keys for lower importance slices, but does not enable using keys of lower importance slices to derive keys for higher importance slices.

An additional layer of security may be provided by dividing a video stream into multiple intervals, and providing a different key seed for each interval. The key seeds are arranged such that key seeds used for previous intervals can be derived from key seeds used for later intervals, but key seeds used in later intervals cannot be derived from key seeds used in previous intervals. The master key, the first key, and the second key for each interval are derived from the key seed for that interval.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows NP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data stores" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "user interface" describes any device or group of devices for presenting and/or receiving information and/or directions to and/or from persons. A user interface may comprise a means to present information to persons, such as a visual display projector or screen, a loudspeaker, a light or system of lights, a printer, a Braille device, a vibrating device, or the like. A user interface may also include a means to receive information or directions from persons, such as one or more or combinations of buttons, keys, levers, switches, knobs, touch pads, touch screens, microphones, speech detectors, motion detectors, cameras, and light detectors. Exemplary user interfaces comprise pagers, mobile phones, desktop computers, laptop computers, handheld and palm computers, personal digital assistants (PDAs), cathode-ray tubes (CRTs), keyboards, keypads, liquid crystal displays (LCDs), control panels, horns, sirens, alarms, printers, speakers, mouse devices, consoles, and speech recognition devices.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

In the context of the present invention, the term "one-way function" describes any cryptographic process that produces an output based upon an input, such that it is computationally infeasible to compute the input based upon the output. Exemplary one-way functions comprise the MD4 algorithm and the MD5 algorithm. The MD4 algorithm is described in R. Rivest, The MD4 Message Digest Algorithm, Request for Comments (RFC) 1320, MIT Laboratory for Computer Science and RSA Data Security, Inc., April 1992. The MD5 algorithm is described in Rivest. R. The MD5 Message-Digest Algorithm, Request for Comments (RFC) 1321, MIT Laboratory for Computer Science and RSA Data Security, Inc., April 1992.

FIG. 1 depicts a block diagram of a computer system 100 suitable for implementing aspects of the present invention. As shown in FIG. 1, system 100 includes a bus 102 which interconnects major subsystems such as a processor 104, an internal memory 106 (such as a RAM), an input/output (I/O) controller 108, a removable memory (such as a memory card) 122, an external device such as a display screen 10 via display adapter 112, a roller-type input device 114, a joystick 116, a numeric keyboard 118, an alphanumeric keyboard 118, directional navigation pad 126 and a wireless interface 120. Many other devices can be connected. Wireless network interface 120, wired network interface 128, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 1 to be present to practice the present invention. Furthermore, the devices and subsystems may be interconnected in different ways from that shown in FIG. 1. Code to implement the present invention may be operably disposed in internal memory 106 or stored on storage media such as removable memory 122, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

Figure 2:
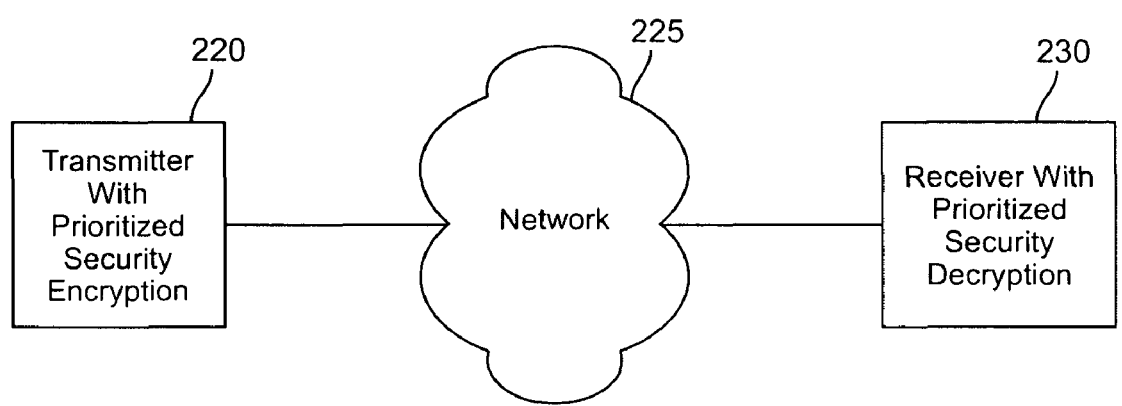
FIG. 2 is a block diagram that illustrates a system for slice-based prioritized secure video streaming in accordance with one embodiment of the present invention.

FIG. 2 is a block diagram that illustrates a system for slice-based prioritized secure video streaming in accordance with one embodiment of the present invention. As shown in FIG. 2, transmitter 220 is communicatively coupled to receiver 230 via network 225. According to one embodiment of the present invention, transmitter 220 is configured to receive a slice comprising multiple macroblocks. Transmitter 220 is configured to not encrypt slices for which secure transmission is of a relatively lowest importance. Transmitter 220 is further configured to select an encryption key based at least in part on a relative importance of secure transmission of the macroblocks. If the relative importance is high, a master key is selected. If the relative importance is medium, a first key is selected as the encryption key. The first key is derivable by applying a one-way function to the master key. If the relative importance is low, a second key is selected. The second key is derivable by applying the one-way function to the first key. The transmitter 220 is further configured to encrypt the slice using the selected encryption key. The transmitter 220 may transmit the encrypted to one or more receivers.

Receiver 230 is configured to receive a slice comprising multiple macroblocks. Receiver is further configured to decrypt the header of the slice using a master key. Receiver 230 is configured to not decrypt slices for which secure transmission is of a relatively lowest importance. Receiver 230 is further configured to select a decryption key based at least in part on an indication in the header, of the relative importance of secure transmission of the macroblocks. If the relative importance of secure transmission of the macroblocks is high, the master key is selected. If the relative importance of secure transmission of the macroblocks is medium, the first key is selected. If the relative importance of secure transmission of the macroblocks is low, the second key is selected. Receiver 230 is further configured to decrypt the slice using the selected decryption key. Receiver 230 may transmit the slice for storage or for use by one or more applications.

According to another embodiment of the present invention, transmitter 220 is configured to select a number of intervals, an interval size, a first one-way function, and a second one-way function. Transmitter 220 is further configured to determine whether one or more slices comprising a plurality of macroblocks are present. Transmitter 220 is further configured to terminate processing of the no slices are present. Transmitter 220 is further configured to, if one or more slices are present, determine whether a valid key seed for the current interval is present. Transmitter 220 is further configured to, if a valid key seed for the current interval is not present, select a key seed for the last interval. Transmitter 220 is further configured to apply the second one-way function to obtain the key seeds for each of the intervals. Transmitter 220 is further configured to determine the current interval. Transmitter 220 is further configured to determine whether the current slice is the first slice of the current interval, and if the current slice is the first slice of the current interval, apply the first one-way function to the key seed for the current interval to obtain the master key, apply the one-way function to the master key to obtain the first key, and apply the one-way function to the first key to obtain the second key. Transmitter 220 is further configured to transmit the key seed for the current interval to one or more receivers. Transmitter 220 is further configured to parse the header of the current slice to obtain an indication of the relative importance of secure transmission of the slice. Transmitter 220 is further configured to not encrypt slices for which secure transmission is of a relatively lowest importance. Transmitter 220 is further configured to select an encryption key based at least in part on a relative importance of secure transmission of the macroblocks. If the relative importance is high, a master key is selected. If the relative importance is medium, a first key is selected. The first key is derivable by applying a one-way function to the master key. If the relative importance is low, a second key is selected. The second key is derivable by applying the one-way function to the first key. Transmitter 220 is further configured to encrypt the slice using the selected encryption key. Transmitter 220 may transmit the encrypted slice to one or more receivers.

Receiver 230 is configured to obtain a number of intervals, an interval size, a first one-way function, and a second one-way function. One or more of the parameters may be obtained from a transmitter. Receiver 230 is further configured to determine whether one or more slices comprising a plurality of macroblocks are present. Receiver 230 is further configured to terminate processing if no slices are present. Receiver 230 is further configured to, if one or more slices are present, determine whether a packet containing a key seed has been received. Receiver 230 is further configured to, if a packet containing a key seed has been received, determine whether the key seed is new. Receiver 230 is further configured to discard the key seed if the key seed is not new. Receiver 230 is further configured to, if the key seed is new, determine all key seeds for prior intervals that were previously unavailable by applying the second one-way function to the newly received key seeds. Receiver 230 is further configured to determine the master key, first key, and second key for each of the derived key seeds. Receiver 230 is further configured to use the newly determined keys to decrypt slices that had been buffered due to unavailability of the required keys.

Receiver 230 is further configured to determine the current interval. Receiver 230 is further configured to determine whether the master key, first key, and second key for the current interval are either available or derivable from a currently available key seed. Receiver 230 is further configured to buffer the slice if the master key, first key, and second key for the current interval are neither available nor derivable from a currently available key seed. Receiver 230 is further configured to, if the master key, first key, and second key for the current interval are either available or derivable from a currently available key seed, decrypt the header of the slice using a master key. Receiver 230 is configured to not decrypt slices for which secure transmission is of a relatively lowest importance. Receiver 230 is further configured to select a decryption key based at least in part on an indication in the header, of the relative importance of secure transmission of the macroblocks. If the relative importance of secure transmission of the macroblocks is high, the master key is selected. If the relative importance of secure transmission of the macroblocks is medium, the first key is selected. If the relative importance of secure transmission of the macroblocks is low, the second key is selected. Receiver 230 is further configured to decrypt the slice using the selected decryption key. Receiver 230 may transmit the decrypted slice for storage or for use by one or more applications.

Figure 3:
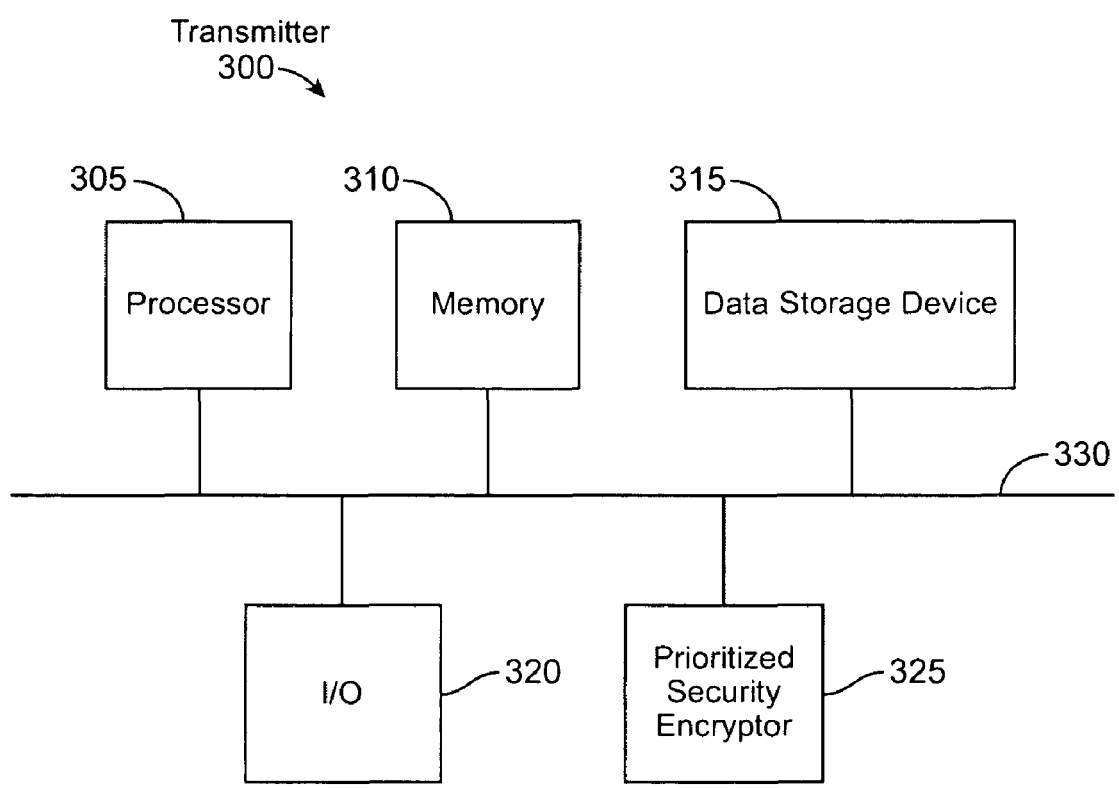
FIG. 3 is a block diagram that illustrates a transmitter for slice-based prioritized secure video streaming in accordance with one embodiment of the present invention.

FIG. 3 is a block diagram that illustrates a transmitter for slice-based prioritized secure video streaming in accordance with one embodiment of the present invention. As shown in FIG. 3, transmitter 300 comprises a processor 305, memory 310, data storage device 315, input/output (I/O) interface 320, and prioritized security encrypter 325 coupled via bus 330. Processor 305 may be configured to perform prioritized security encryption of slices as disclosed herein. Alternatively, prioritized security encrypter 325 may be configured to perform prioritized security encryption under control of processor 305. Memory 310 and data storage device 315 may be used for storing or buffering unencrypted slices before they are encrypted, and for storing encrypted slices before they are transmitted to one or more receivers. I/O interface 320 is configured to provide an interface between transmitter 300 and other devices.

Figure 4:
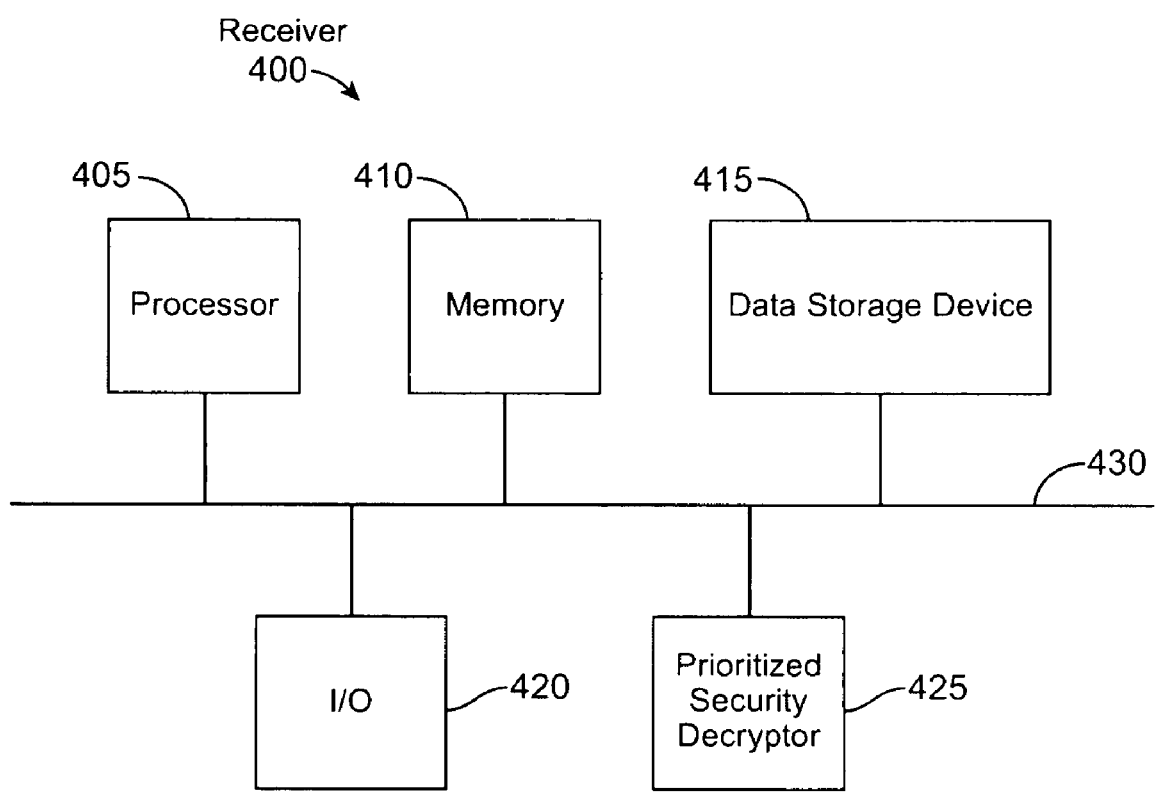
FIG. 4 is a block diagram that illustrates a receiver for slice-based prioritized secure video streaming in accordance with one embodiment of the present invention.

FIG. 4 is a block diagram that illustrates a receiver for slice-based prioritized secure video streaming in accordance with one embodiment of the present invention. As shown in FIG. 4, receiver 400 comprises a processor 405, memory 410, data storage device 415, input/output (I/O) interface 420, and prioritized security decryptor 425 coupled via bus 430. Processor 405 may be configured to perform prioritized security decryption of slices as disclosed herein. Alternatively, prioritized security decryptor 425 may be configured to perform prioritized security decryption under control of processor 405. Memory 410 and data storage device 415 may be used for storing or buffering encrypted slices before they are decrypted, and for storing decrypted slices before they are transmitted to one or more applications. I/O interface 420 is configured to provide an interface between transmitter 400 and other devices.

Figure 5A:
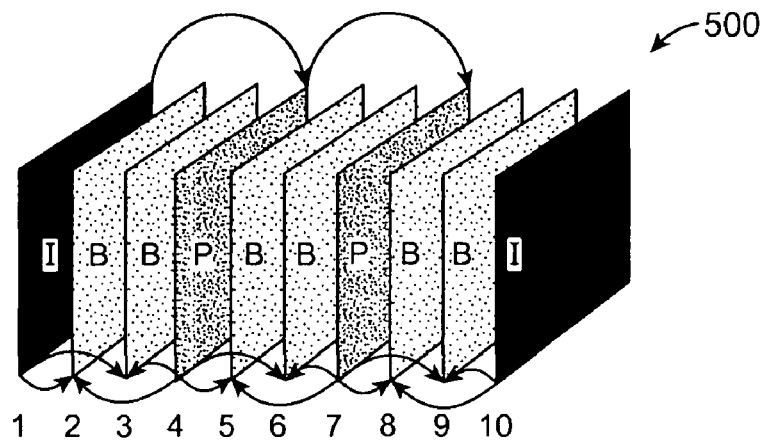
FIG. 5A is a block diagram that illustrates a typical GOP structure of a compressed video sequence.

FIG. 5A is a block diagram that illustrates a typical GOP structure of a compressed video sequence. MPEG encoding exploits intra-frame spatial redundancy and inter-frame temporal redundancy. Intra-frame encoding is accomplished using DCT based compression for the reduction of spatial redundancy, while block-based motion compensation is used for exploiting temporal redundancy for inter-frame encoding. A MPEG stream comprises three kinds of frames, I-frames (intra-frame), P-frames (forward predicted frames) and B frames (bi-directional predicted frames).

I-frames can be reconstructed without the reference of any other frames. P-frames are forward predicted from the last I-frames or P-frames. B-frames are forward predicted and backward predicted from the last and next I-frames or P-frames. A number of these frames are grouped to form a Group Of Picture (GOP). A GOP has little or no dependence on the pictures in adjacent GOPs. FIG. 5A illustrates a typical GOP, indicating the forward prediction of the P-frames, the forward prediction of the B-frames, and the backward prediction of B-frames.

Each of these frames comprises a series of independently decodable units called slices. The slices can be further fragmented to a series of macroblocks. The macroblocks depend on neighboring macroblocks within each slice for predictive coding of transform coefficient and motion vectors. However, macroblocks in different slices are not dependent on each other. I-frames can only contain I-macroblocks. However, P-frames and B-frames can also contain L-macroblocks.

Figure 5B:
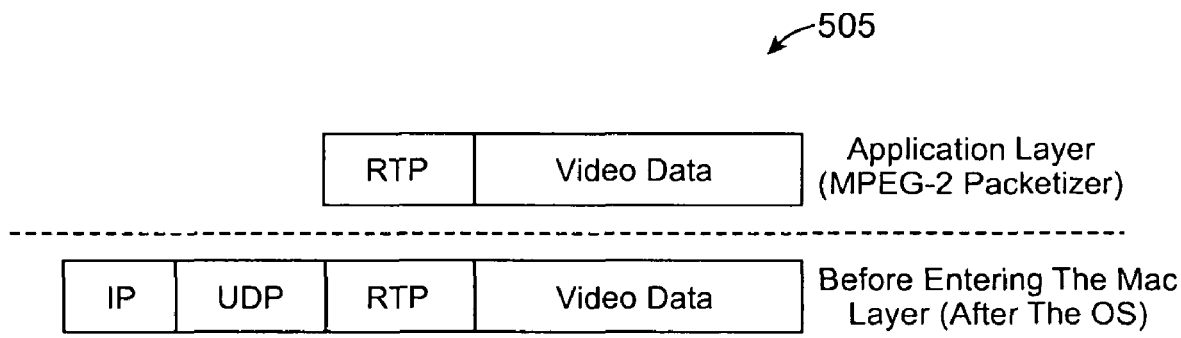
FIG. 5B is a block diagram that illustrates an application layer MPEG packet and a MAC layer MPEG packet.
Figure 5C:
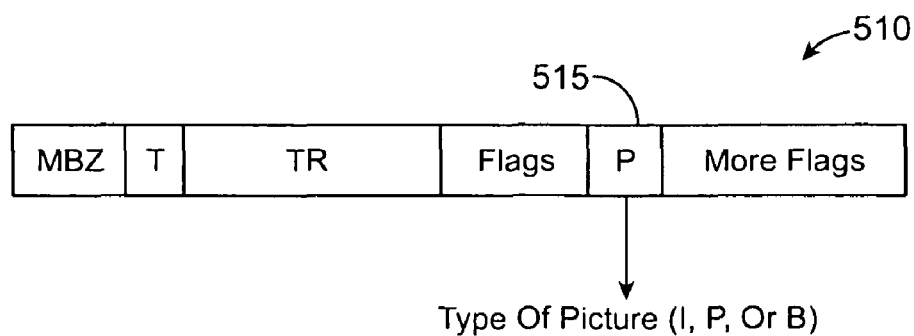
FIG. 5C is a block diagram that illustrates an MPEG packet header.

FIG. 5B is a block diagram that illustrates an application layer MPEG packet and a MAC layer MPEG packet. And FIG. 5C is a block diagram that illustrates an MPEG packet header. According to one embodiment of the present invention, the importance of securely transmitting a slice is indicated by the type-of-picture flag 515 of the packet header 510 for the packet containing all or part of the slice. According to one embodiment of the present invention, the relative importance of secure transmission of I frame slices and headers is high, the relative importance of secure transmission of P frame slices which contain more than a predetermined amount ($\alpha$) of I-macroblocks is medium, and the relative importance of secure transmission of B frame slices which contain more than a second predetermined amount ($\beta$) of I-macroblocks is low. All other slices are considered to have a relatively lowest importance. According to another embodiment of the present invention, $1>\alpha>\beta>0$.

Figure 6:
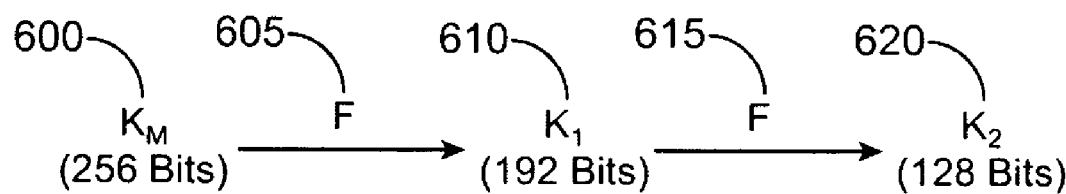
FIG. 6 is a block diagram that illustrates key structure for a single layer prioritized secure video streaming in accordance with one embodiment of the present invention.

FIG. 6 is a block diagram that illustrates key structure for a single layer prioritized secure video streaming in accordance with one embodiment of the present invention. As shown in FIG. 6, a first key $K_1$ 610 is derived by applying a first one-way function F (605, 615) to a master key $K_m$ 600. A second key $K_2$ 620 is derived by applying the first one-way function F (605, 615) to the first key $K_1$ 610. Although specific bit lengths are shown for the master key $K_m$ 600, the first key $K_1$ 610 and the second key $K_2$ 620, keys of other sizes may be used. According to one embodiment of the present invention, the master key bit length is greater than the first key bit length, which is greater than the second key bit length.

According to one embodiment of the present invention, the Advanced Encryption Standard (AES) is used for encryption. Other encryption methods may be used. Additionally, various blockcipher modes of operation may be used, such as cipher-block chaining (CBC), output feedback (OFB), cipher feedback (CFB), and the like.

Figure 7:
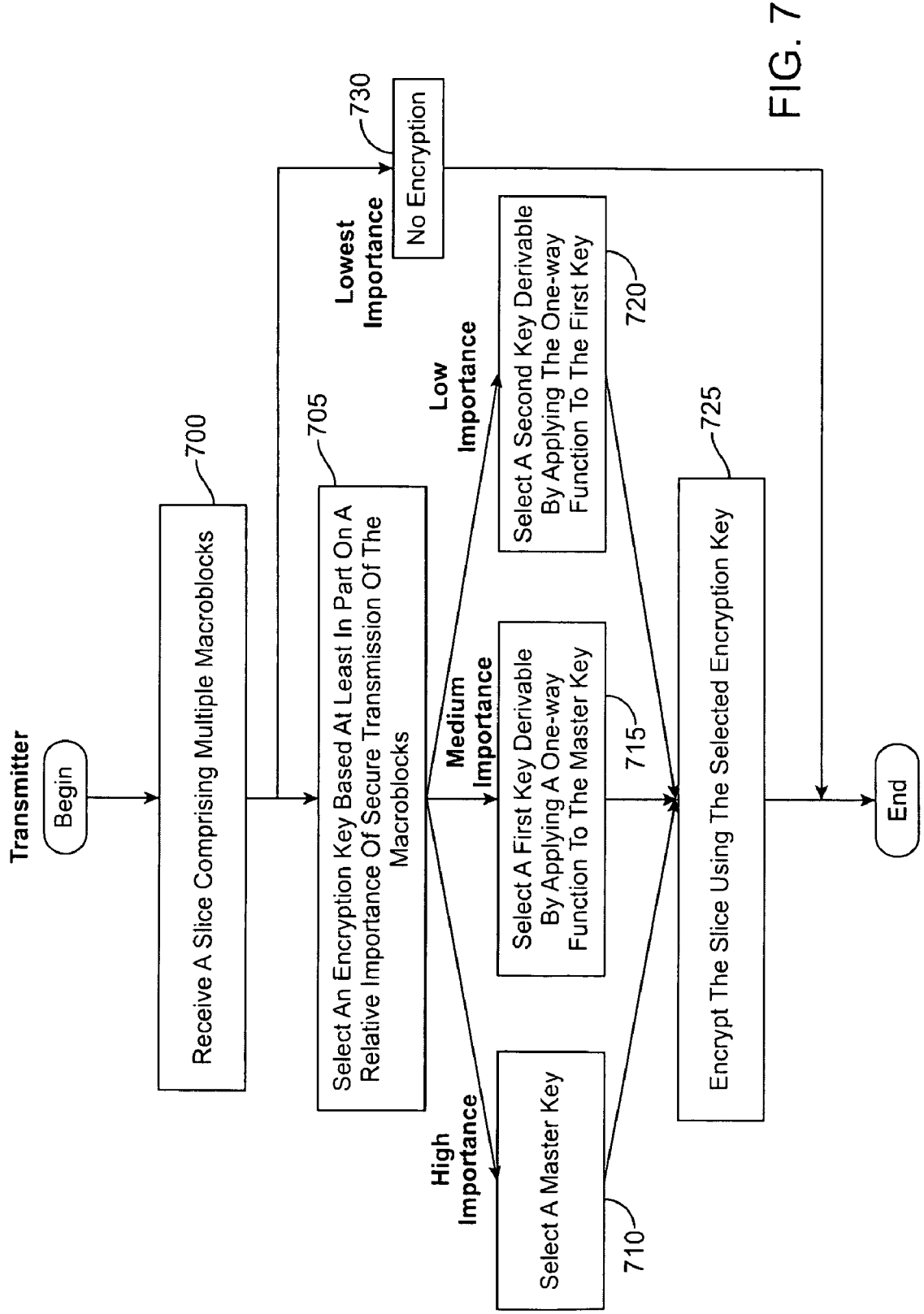
FIG. 7 is a flow diagram that illustrates a method for slice-based prioritized secure video streaming from the perspective of a transmitter, in accordance with one embodiment of the present invention.

FIG. 7 is a flow diagram that illustrates a method for slice-based prioritized secure video streaming from the perspective of a transmitter, in accordance with one embodiment of the present invention. The processes illustrated in FIG. 7 may be implemented in hardware, software, firmware, or a combination thereof. For example, the processes illustrated in FIG. 7 may be performed by transmitter 220 of FIG. 2. At 700, a slice comprising multiple macroblocks is received. If the relative importance of secure transmission of the macroblocks is the lowest, the slice is not encrypted 730. If the relative importance of secure transmission of the macroblocks is not the lowest, at 705-720, an encryption key is selected based at least in part on a relative importance of secure transmission of the macroblocks. If the relative importance is high, a master key is selected as the encryption key at 710. If the relative importance is medium, a first key is selected as the encryption key at 715. The first key is derivable by applying a one-way function to the master key. If the relative importance is low, a second key is selected at 720. The second key is derivable by applying the one-way function to the first key. At 725, the slice is encrypted using the selected encryption key. The encrypted slice may be transmitted to one or more receivers.

According to one embodiment of the present invention, the relative importance of secure transmission of I frame slices and headers is high, the relative importance of secure transmission of P frame slices which contain more than a predetermined amount ($\alpha$) of I-macroblocks is medium, and the relative importance of secure transmission of B frame slices which contain more than a second predetermined amount ($\beta$) of I-macroblocks is low. According to another embodiment of the present invention, $1>\alpha>\beta>0$.

According to one embodiment of the present invention, the master key is securely transmitted to one or more receiver before receiving the slice at 700.

Figure 8:
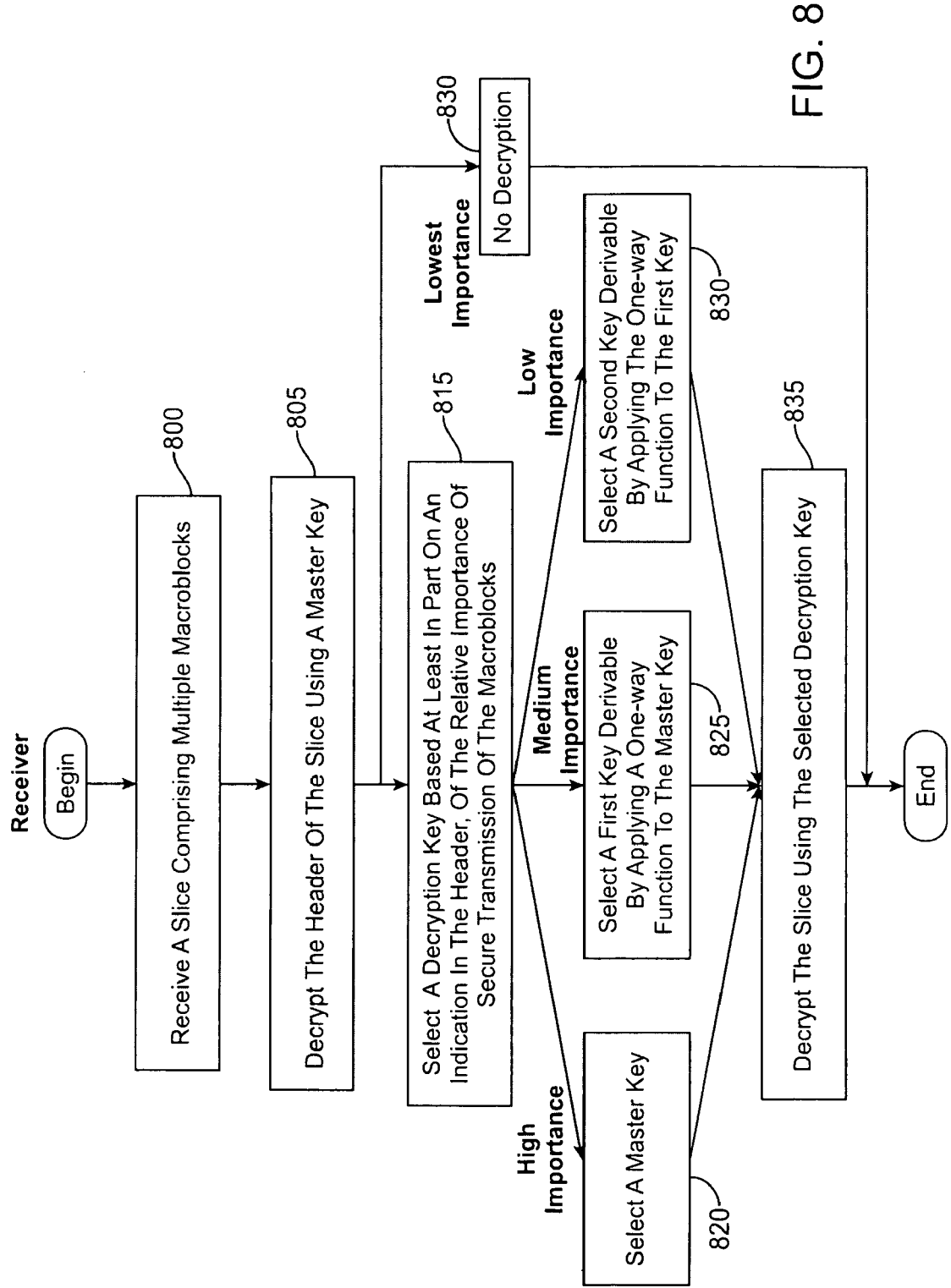
FIG. 8 is a flow diagram that illustrates a method for slice-based prioritized secure video streaming from the perspective of a receiver, in accordance with one embodiment of the present invention.

FIG. 8 is a flow diagram that illustrates a method for slice-based prioritized secure video streaming from the perspective of a receiver, in accordance with one embodiment of the present invention. The processes illustrated in FIG. 8 may be implemented in hardware, software, firmware, or a combination thereof. For example, the processes illustrated in FIG. 8 may be performed by receiver 230 of FIG. 2. At 800, a slice comprising multiple macroblocks is received. At 805, the header of the slice is decrypted using a master key. If, based upon an indication in the header, the relative importance of secure transmission of the macroblocks is the lowest, the slice is not decrypted 830. If the relative importance of secure transmission of the macroblocks is not the lowest, at 815-830, a decryption key is selected based at least in part on the indication in the header, of the relative importance of secure transmission of the macroblocks. If the relative importance of secure transmission of the macroblocks is high, the master key is selected at 820. If the relative importance of secure transmission of the macroblocks is medium, the first key is selected at 825. If the relative importance of secure transmission of the macroblocks is low, the second key is selected at 830. At 835, the slice is decrypted using the selected decryption key. The decrypted slice may be transmitted for storage or for use by one or more applications.

Figure 9:
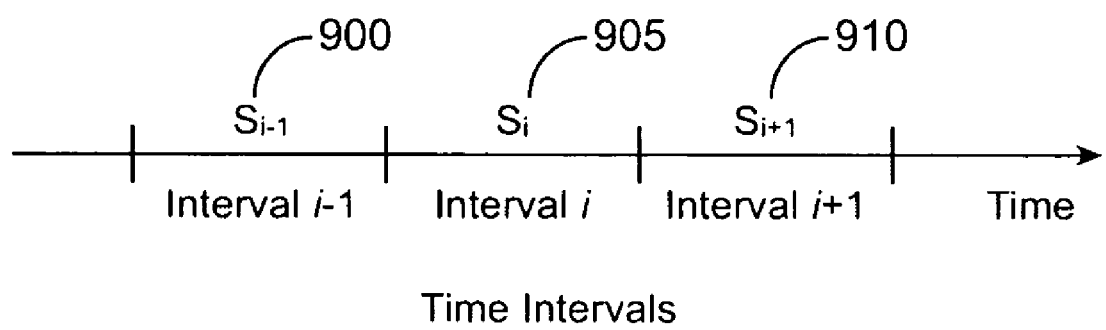
FIG. 9 is a block diagram that illustrates multiple time intervals for a streaming video.

FIG. 9 is a block diagram that illustrates multiple time intervals for a streaming video. As shown in FIG. 9, a streaming video is divided into three intervals: i−1, i, and i+1. The key seeds for intervals i−1, i, and i+1 are shown as $S_{i-1}$, $S_i$, and $S_{i+1}$, respectively. Key seed generation begins with the key seed for the latest interval i+1, and key seed use begins with the key seed for the earliest interval i−1. Although three intervals are illustrated, any number of intervals may be used.

Figure 10:
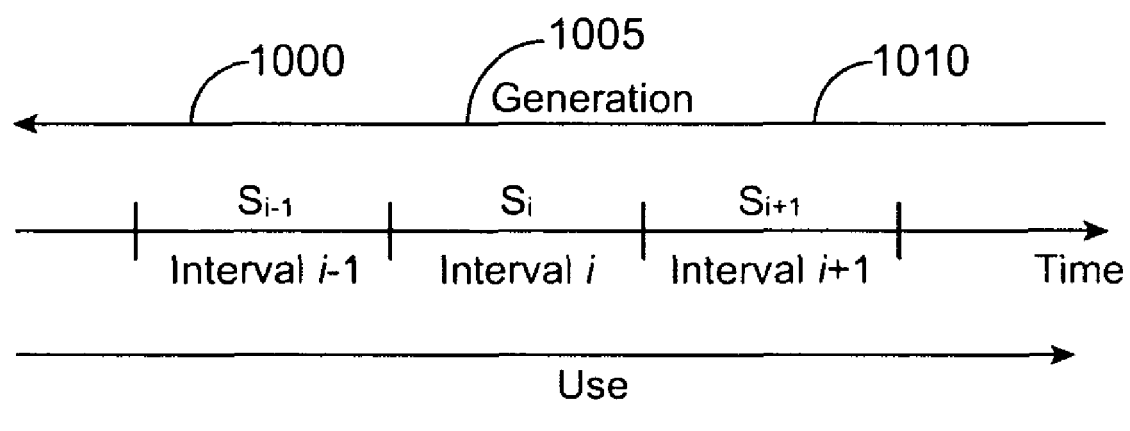
FIG. 10 is a block diagram that illustrates key seed generation for dual layer slice-based prioritized secure video streaming in accordance with one embodiment of the present invention.

FIG. 10 is a block diagram that illustrates key seed generation for dual layer slice-based prioritized secure video streaming in accordance with one embodiment of the present invention. FIG. 10 illustrates the relationship between key seeds for intervals. The key seeds for intervals i−1, i, and i+1 are indicated as $S_{i-1}$ (1000), $S_i$ (1005), and $S_{i+1}$ (1010), respectively. Key seed generation starts with selecting a key seed for the last interval i+1. Earlier key seeds are generated by applying a second one-way function to the key seed of the previous interval. In the example illustrated in FIG. 10, key seed generation begins with the selection of key seed $S_{i+1}$. Key seed $S_i$ is generated by applying the second one-way function to interval i+1 key seed $S_{i+1}$. Key seed $S_{i-1}$ is generated by applying the second one-way function to interval i key seed $S_i$.

Figure 11:
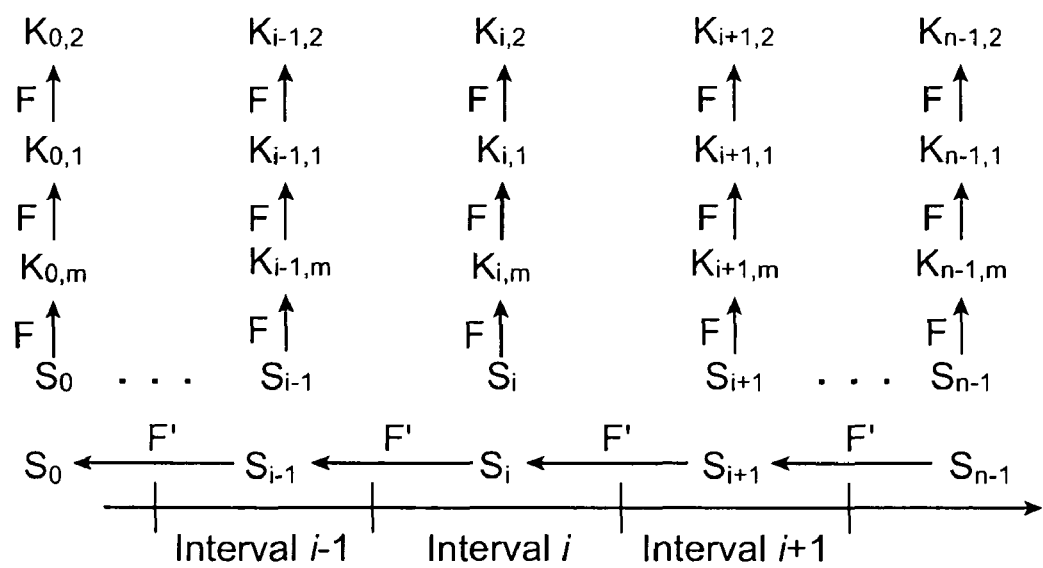
FIG. 11 is a block diagram that illustrates key structure for dual layer slice-based prioritized secure video streaming in accordance with one embodiment of the present invention.

FIG. 11 is a block diagram that illustrates key structure for dual layer slice-based prioritized secure video streaming in accordance with one embodiment of the present invention. FIG. 11 illustrates the relationship between key seeds for intervals, and the relationship between the master key, first key, and second key of each interval. The key seeds for intervals i−1, i, and i+1 are indicated as $S_{i-1}$, $S_i$, and $S_{i+1}$, respectively. The master keys for intervals i−1, i, and i+1 are indicated as $K_{i-1,m}$, $K_{i,m}$, and $K_{i+1,m}$, respectively. The first keys for intervals i−1, i, and i+1 are indicated as $K_{i-1,1}$, $K_{i,1}$, and $K_{i+1,1}$, respectively. The second keys for intervals i−1, i, and i+1 are indicated as $K_{i-1,2}$, $K_{i,2}$, and $K_{i+1,2}$, respectively. The keys for an earlier interval may be derived from the key seed of a later interval, but the keys for a later interval may not be derived from the key seed of an earlier interval. For example, keys $K_{i-1,m}$, $K_{i-1,1}$, and $K_{i-1,2}$ for interval i−1 may be obtained from the seed for later interval i+1 as follows. Applying the second one-way function to interval i+1 key seed $S_{i+1}$ yields interval i key seed $S_i$, Applying the second one-way function to interval i key seed $S_i$ yields interval i−1 key seed $S_{i-1}$, applying the first one-way function to interval i−1 key seed $S_{i-1}$, yields interval i−1 master key $K_{i-1,m}$, applying the first one-way function to interval i−1 master key $K_{i-1,m}$ yields interval i−1 first key $K_{i-1,1}$, and applying the first one-way function to interval i−1 first key $K_{i-1,1}$ yields interval i−1 second key $K_{i-1,2}$. Conversely, if interval i−1 key seed $S_{i-1}$ is the known and the key seeds for later intervals are not known, the master key, first key, and second key for intervals later than interval i−1 are not derivable.

Figure 12:
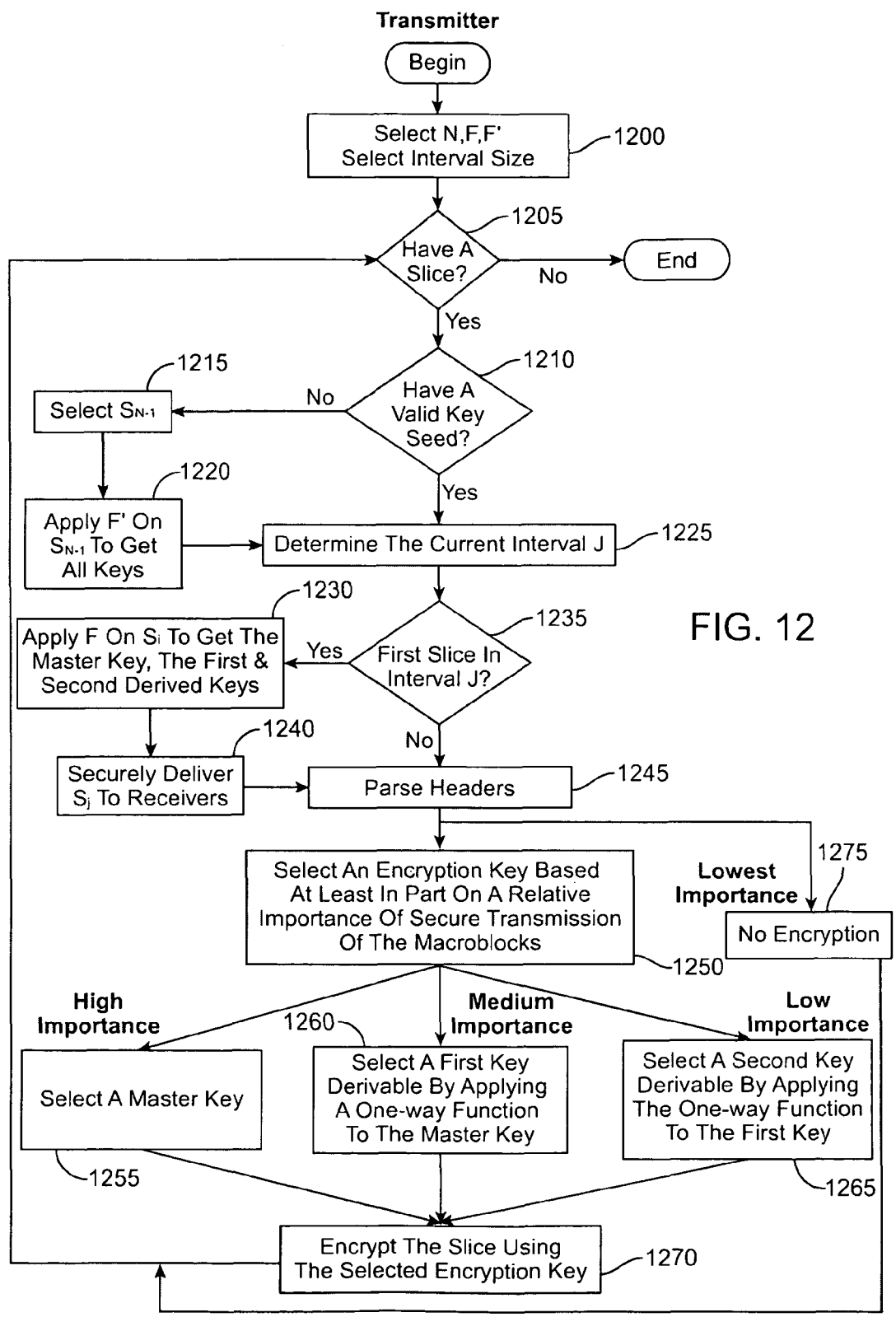
FIG. 12 is a flow diagram that illustrates a method for dual layer slice-based prioritized secure video streaming from the perspective of a transmitter, in accordance with one embodiment of the present invention.

FIG. 12 is a flow diagram that illustrates a method for dual layer slice-based prioritized secure video streaming from the perspective of a transmitter, in accordance with one embodiment of the present invention. The processes illustrated in FIG. 12 may be implemented in hardware, software, firmware, or a combination thereof. For example, the processes illustrated in FIG. 12 may be performed by transmitter 220 of FIG. 2. At 1200, a number of intervals (N), an interval size, a first one-way function (F), and a second one-way function (F') are selected. At 1205, a determination regarding whether one or more slices comprising a plurality of macroblocks are present. If no slices are present, the process terminates. If one or more slices are present, at 1210 a determination is made regarding whether a valid key seed for the current interval is present. If a valid key seed for the current interval is not present, a key seed for the last interval ($S_{N-1}$) is selected, and at 1220, the second one-way function is applied to obtain the key seeds for each of the intervals. At 1225, the current interval is determined. At 1235, a determination is made regarding whether the current slice is the first slice of the current interval. If the current slice is the first slice of the current interval, at 1230 the first one-way function is applied to the key seed for the current interval to obtain the master key, the one-way function is applied to the master key to obtain the first key, and the one-way function is applied to the first key to obtain the second key. At 1240, the key seed for the current interval is transmitted to one or more receivers. At 1245, the header of the current slice is parsed to obtain an indication of the relative importance of secure transmission of the slice. If the relative importance of secure transmission of the macroblocks is the lowest, the slice is not encrypted 1275. If the relative importance of secure transmission of the macroblocks is not the lowest, at 1250-1265, an encryption key is selected based at least in part on a relative importance of secure transmission of the macroblocks. If the relative importance is high, a master key is selected as the encryption key at 1255. If the relative importance is medium, a first key is selected as the encryption key at 1260. The first key is derivable by applying a one-way function to the master key. If the relative importance is low, a second key is selected at 1265. The second key is derivable by applying the one-way function to the first key. At 1270, the slice is encrypted using the selected encryption key. The encrypted slice may be transmitted to one or more receivers.

Figure 13:
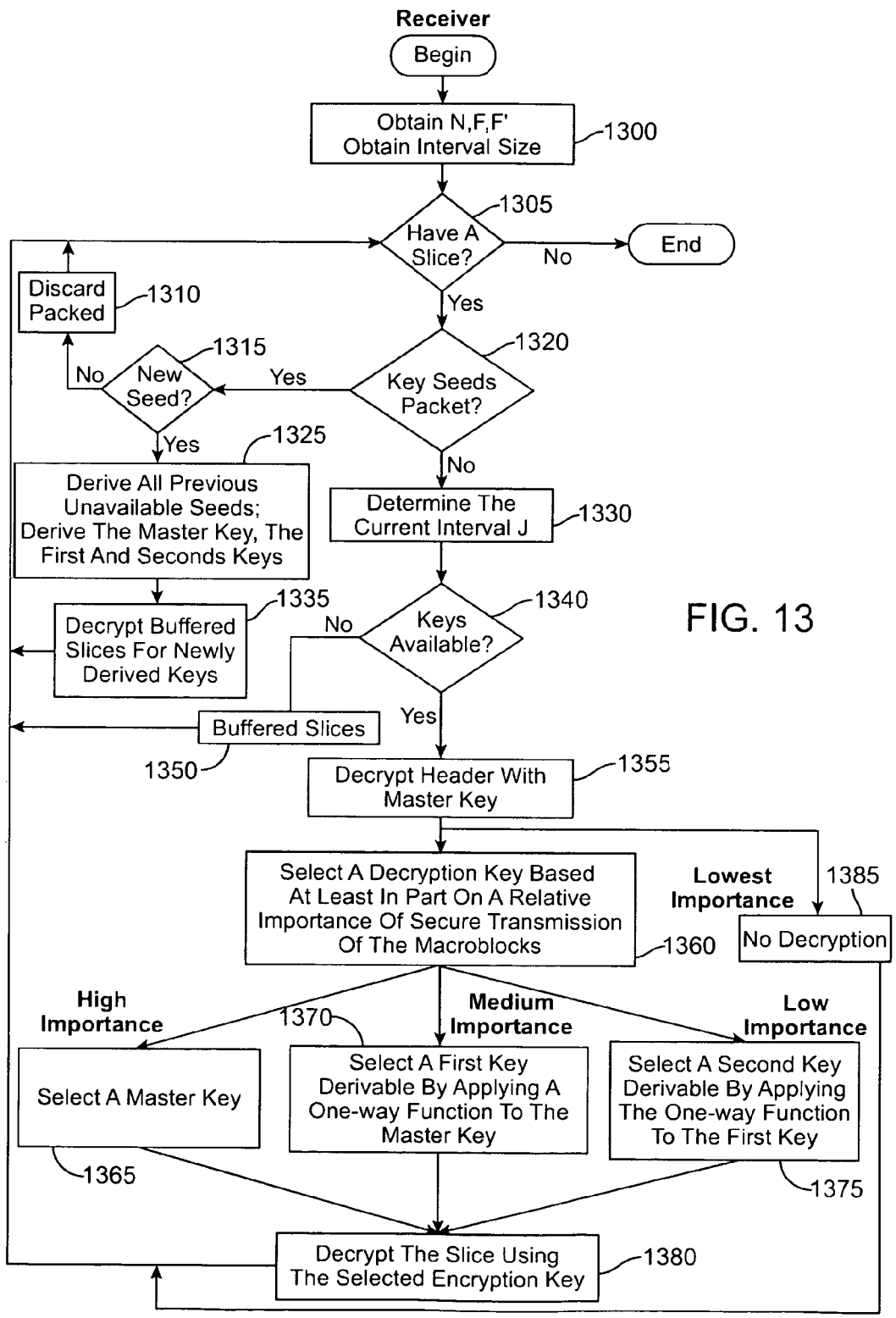
FIG. 13 is a flow diagram that illustrates a method for dual layer slice-based prioritized secure video streaming from the perspective of a receiver, in accordance with one embodiment of the present invention.

FIG. 13 is a flow diagram that illustrates a method for dual layer slice-based prioritized secure video streaming from the perspective of a receiver, in accordance with one embodiment of the present invention. The processes illustrated in FIG. 13 may be implemented in hardware, software, firmware, or a combination thereof. For example, the processes illustrated in FIG. 13 may be performed by receiver 230 of FIG. 2. At 1300, a number of intervals (N), an interval size, a first one-way function (F), and a second one-way function (F') are obtained. One or more of the parameters may be obtained from a transmitter. At 1305, a determination regarding whether one or more slices comprising a plurality of macroblocks are present. If no slices are present, the process terminates. If one or more slices are present, at 1320 a determination is made regarding whether a packet containing a key seed has been received. If a packet containing a key seed has been received, at 1315 a determination is made regarding whether the key seed is new. If the key seed is not new, it is discarded at 1310. If the key seed is new, at 1325 all key seeds for prior intervals that were previously unavailable are determined by applying the second one-way function to the respective earlier key seeds. Also at 1325, the master key, first key, and second key for each of the derived key seeds are determined. At 1335, slices that had been buffered due to unavailability of the required keys, are decrypted.

If there is no key seeds packet at 1320, at 1330, the current interval is determined. At 1340, a determination is made regarding whether the master key, first key, and second key for the current interval are either available or derivable from a currently available key seed. If the master key, first key, and second key for the current interval are neither available nor derivable from a currently available key seed, the slice is buffered at 1350 until the receiver receives or derives the master key, first key, and second key for the current interval. If the master key, first key, and second key for the current interval are either available or derivable from a currently available key seed, at 1355, the header of the slice is decrypted using a master key. If, based upon an indication in the header, the relative importance of secure transmission of the macroblocks is the lowest, the slice is not decrypted 830. If the relative importance of secure transmission of the macroblocks is not the lowest, at 1360-1375, a decryption key is selected based at least in part on the indication in the header, of the relative importance of secure transmission of the macroblocks. If the relative importance of secure transmission of the macroblocks is high, the master key is selected at 1365. If the relative importance of secure transmission of the macroblocks is medium, the first key is selected at 1370. If the relative importance of secure transmission of the macroblocks is low, the second key is selected at 1375. At 1380, the slice is decrypted using the selected decryption key. The decrypted slice may be transmitted for storage or for use by one or more applications.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
   receiving a slice comprising a plurality of macroblocks by a transmitter having a processor, a memory, an I/O interface and an encrypter;
   selecting an encryption key based at least in part on a relative importance of secure transmission of the macroblocks, the encryption key comprising:
   if the importance is high, a master key;
   if the importance is medium, a first key derivable by applying a one-way function to the master key; and
   if the importance is low, a second key derivable by applying the one-way function to the first key; and
   encrypting, by the transmitter, the slice using the encryption key for transmission to one or more receivers having a processor, a memory, an I/O interface and a decryptor, wherein the relative importances of secure transmission of I frame slices and headers, P frame slices which contain more than a first predetermined amount ($\alpha$) of I-macroblocks, and B frame slices which contain more than a second predetermined amount ($\beta$) of I-macroblocks, are high, medium, and low, respectively, and the relative importance of other slices is lowest.

2. The method of claim 1, wherein $1>\alpha>\beta>0$.

3. The method of claim 1, further comprising transmitting the slice after the encrypting.

4. The method of claim 1, further comprising securely transmitting the master key to the one or more receivers before the receiving.

5. A method comprising:
receiving by one or more receivers an encrypted slice comprising a plurality of macroblocks from a transmitter;
decrypting, by the one or more receivers, a header of the slice using a master key, the header comprising an indication of a relative importance of secure transmission of the macroblocks;
selecting a decryption key based at least in part on the indication, the decryption key comprising:
if the importance is high, the master key;
if the importance is medium, a first key derivable by applying a one-way function to the master key; and
if the importance is low, a second key derivable by applying the one-way function to the first key; and
decrypting, by the one or more receivers, the slice using the decryption key,
wherein the transmitter has a processor, a memory, an I/O interface and an encrypter and the one or more receivers having a processor, a memory, an I/O interface and a decryptor.

6. The method of claim 5 wherein the relative importances of secure transmission of I frame slices and headers, P frame slices which contain more than a first predetermined amount ($\alpha$) of I-macroblocks, and B frame slices which contain more than a second predetermined amount ($\beta$) of I-macroblocks, are high, medium, and low, respectively, and the relative importance of other slices is lowest.

7. The method of claim 6, wherein $1>\alpha>\beta>0$.

8. The method of claim 5, further comprising transmitting the slice after the decrypting.

9. The method of claim 5, further comprising:
receiving the master key via a secure transmission before receiving the encrypted slice;
applying a one-way function to the master key to derive the first key; and
applying the one-way function to the first key to derive the second key.

10. A method comprising:
determining a plurality of key seeds, each of the key seeds corresponding to a particular one of a plurality of intervals over which a plurality of slices are streamed, the determining comprising applying a second one-way function to a last key seed corresponding to a last interval to obtain a previous key seed corresponding to a previous interval, and continuing to apply the second one-way function to each determined key seed until all key seeds corresponding to all of the plurality of intervals are obtained;
receiving a slice comprising a plurality of macroblocks by a transmitter having a processor, a memory, an I/O interface and an encrypter;
if the slice comprises a first slice of a current interval, securely transmitting a current key seed corresponding to the current interval to one or more receivers having a processor, a memory, an I/O interface and a decryptor;
selecting an encryption key based at least in part on a relative importance of secure transmission of the macroblocks, the encryption key comprising:
if the importance is high, a master key derivable by applying a first one-way function to the key seed;
if the importance is medium, a first key derivable by applying the first one-way function to the master key; and
if the importance is low, a second key derivable by applying the first one-way function to the first key; and
encrypting, by the transmitter, the slice using the encryption key for transmitting to the one or more receivers.

11. The method of claim 10 wherein the relative importances of secure transmission of I frame slices and headers, P frame slices which contain more than a first predetermined amount ($\alpha$) of I-macroblocks, and B frame slices which contain more than a second predetermined amount ($\beta$) of I-macroblocks, are high, medium, and low, respectively, and the relative importance of other slices is lowest.

12. The method of claim 11, wherein $1>\alpha>\beta>0$.

13. The method of claim 10, further comprising transmitting the slice after the encrypting.

14. The method of claim 10, further comprising appending an unencrypted and an encrypted interval number with the master key.

15. The method of claim 10, further comprising:
receiving at the one or more receivers, the current key seed corresponding to the current interval;
receiving, by the one or more receivers, the encrypted slice;
decrypting, by the one or more receivers, a header of the slice using a master key derivable by applying a one-way function to the key seed, the header comprising an indication of a relative importance of secure transmission of the macroblocks;
selecting a decryption key based at least in part on the indication, the decryption key comprising:
if the importance is high, the master key;
if the importance is medium, a first key derivable by applying the one-way function to the master key; and
if the importance is low, a second key derivable by applying the one-way function to the first key; and
decrypting, by the one or more receivers, the slice using the decryption key.

16. The method of claim 15 wherein the relative importances of secure transmission of I frame slices and headers, P frame slices which contain more than a first predetermined amount ($\alpha$) of I-macroblocks, and B frame slices which contain more than a second predetermined amount ($\beta$) of I-macroblocks, are high, medium, and low, respectively, and the relative importance of other slices is lowest.

17. The method of claim 16, wherein $1>\alpha>\beta>0$.

18. The method of claim 15, further comprising transmitting the slice after the decrypting.

19. The method of claim 15, further comprising:
decrypting an encrypted interval number in the header using the master key to create a decrypted interval number; and
dropping the slice if the decrypted interval number does not match an unencrypted interval number in the header.

* * * * *